United States Patent [19]

Schirmer

[11] Patent Number: 5,089,073
[45] Date of Patent: Feb. 18, 1992

[54] HIGH STRENGTH LAMINATED FILM FOR CHUB PACKAGING

[75] Inventor: Henry G. Schirmer, Spartanburg, S.C.

[73] Assignee: W. R. Grace & Co.-Conn., Duncan, S.C.

[21] Appl. No.: 639,602

[22] Filed: Jan. 10, 1991

Related U.S. Application Data

[62] Division of Ser. No. 249,631, Sep. 26, 1988, Pat. No. 5,037,683.

[51] Int. Cl.⁵ ............................................. B29C 47/06
[52] U.S. Cl. ......................... 156/244.11; 156/244.14; 156/244.23; 156/244.24; 428/36; 428/513; 428/515; 428/516; 428/518; 428/520; 428/910
[58] Field of Search ................... 156/244.11, 244.14, 156/244.23, 244.24; 428/349, 513, 515, 516, 518, 520, 910, 36

[56] References Cited

U.S. PATENT DOCUMENTS

| | | | |
|---|---|---|---|
| 4,194,039 | 3/1980 | Mueller | 156/244.11 |
| 4,505,969 | 3/1985 | Weiner | 156/244.11 |
| 4,542,075 | 9/1985 | Schirmer | 428/518 |
| 4,574,104 | 3/1986 | Aishima et al. | 156/244.11 |
| 4,724,185 | 2/1988 | Shah | 428/36.7 |
| 4,737,391 | 4/1988 | Lustig et al. | 428/35.4 |
| 4,828,891 | 5/1989 | Lustig et al. | 428/35.4 |
| 4,833,024 | 5/1989 | Mueller | 428/518 |
| 4,853,287 | 8/1989 | Schirmer | 428/349 |
| 4,863,769 | 9/1989 | Lustig et al. | 428/518 |
| 4,892,603 | 1/1990 | Lustig et al. | 156/244.11 |
| 4,909,726 | 3/1990 | Bekele | 428/349 |
| 4,909,881 | 3/1990 | Garland | 156/244.14 |
| 4,937,112 | 6/1990 | Schirmer | 428/518 |
| 4,938,683 | 7/1990 | Boice | 428/910 |
| 4,940,634 | 7/1990 | Mueller et al. | 428/410 |

*Primary Examiner*—Caleb Weston
*Attorney, Agent, or Firm*—William D. Lee, Jr.; Leigh P. Gregory; Mark B. Quatt

[57] ABSTRACT

A multilayer laminated film useful in chub packaging comprises a core film comprising a biaxially oriented film, and an outer hot blown film bonded to each of the opposing surfaces of the core layer, at least one of the films including a layer of an oxygen barrier polymeric material.

4 Claims, 2 Drawing Sheets

HIGH STRENGTH LAMINATED FILM FOR CHUB PACKAGING

This is a divisional application of application Ser. No. 249,631, filed on Sept. 26, 1988 now U.S. Pat. No. 5,037,683.

BACKGROUND OF THE INVENTION

This invention relates generally to a laminated film suitable for packaging, and more particularly to a laminated film suitable for use in chub packaging and having improved tensile strength and seal strength properties.

Certain foods, and particularly meat products such as ground beef and other comminuted food substances, are commonly packaged in what are called chub packages. These packages are generally produced at central processing plants operated by supermarket chains or meat packing companies. These packages are generally produced using a vertical form fill seal (VFFS) process, in which a tube is formed from a flat sheet of roll stock film. The tube is formed vertically and longitudinally sealed with a vertical sealing bar. The bottom of the tube is then sealed with a clip applied to the bottom of the tube, the meat product such as ground beef is pumped into the open end of the tube, and the top is sealed with a clip to produce the final chub package. In appearance, these chubs resemble semi-rigid tubes with the tubular film forming a skin tight layer around the food product.

Package sizes may range from 1 to 20 pounds, depending on the intended mode of distribution. Pumping equipment typically used to stuff the food product into the tubular film can place great stress on the longitudinal seal of the tube. This longitudinal seal is usually a lap seal.

More recently, crust-frozen items have become more popular, and the hardening of the outer surface of the food product in the tubular casing during the freezing process can produce further stress on the longitudinal seal.

Successful films for use in such applications include the HS660 and HS2000 films produced commercially by the Cryovac Division of W. R. Grace & Co. The films are composed of lay-flat tubular film. Prior to collapse, the HS660 film includes an inner layer of ethylene vinyl acetate copolymer (EVA) and an outer layer of polyethylene (PE). The two core layers comprise nylon, with an intermediate layer between each nylon layer and respective outer layer and inner layers comprising ionomer resins. In case of HS2000, an ethylene vinyl alcohol copolymer replaces the nylon layer closest to the inside of the structure.

While such materials have been very useful in producing chub packaging, it is an object of the present invention to further improve the performance of chub packaging materials, especially under conditions where improved seal strength and lower transverse elongation are desirable.

SUMMARY OF THE INVENTION

In one aspect of the invention, a multilayer laminated film useful in chub packaging comprises a core film comprising a biaxially oriented film, and an outer film bonded to each of the opposing surfaces of the core film, and comprising a hot blown film, wherein at least one of the films include a layer of an oxygen barrier polymeric material.

In another aspect of the present invention, a method of making a multilayer laminated film useful in chub packaging comprises melt extruding a first film having a layer of ethylene alpha-olefin copolymer and a layer of ethylene vinyl acetate copolymer; biaxially orienting said film; melt extruding two multilayer films by the hot blown method; and adhering each of the two hot blown films, at their bonding layers, to opposing surfaces of the first film; at least one of the films including a layer of an oxygen barrier polymeric material.

BRIEF DESCRIPTION OF THE DRAWINGS

The invention may be further understood by reference to the attached drawings wherein.

DETAILED DESCRIPTION OF THE PREFERRED EMBODIMENT

Figure 1:
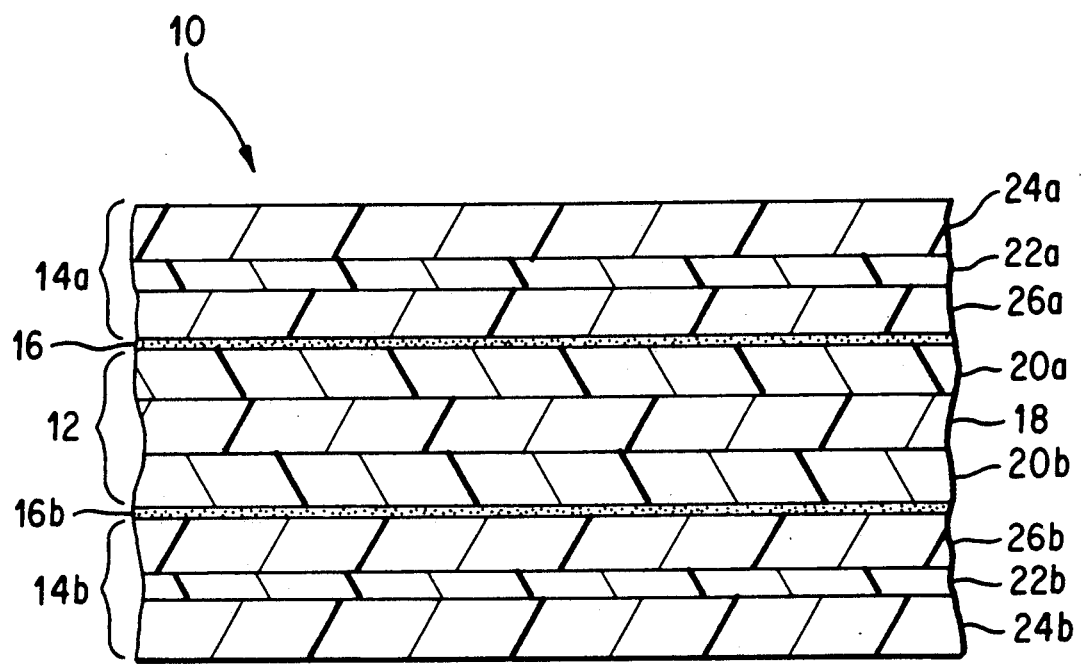
FIG. 1 is a schematic cross-sectional view of one embodiment of the present invention.

Referring to FIG. 1, a multilayer laminated film 10 includes a core film 12 comprising a biaxially oriented film.

In one embodiment, core film 12 has a central layer 18 made up of ethylene vinyl acetate copolymer, and outer layers 20a and 20b of linear low density polyethylene.

In another embodiment, core film 12 has a central layer 18 of ethylene vinyl acetate copolymer, two intermediate layers of linear low density polyethylene, and an additional layer of ethylene vinyl acetate copolymer on each surface to make up a five-layer film. This latter film is commercially available as SSD 310 film manufactured by W. R. Grace & Co.-Conn. through its Cryovac Division.

An alternative material for layers bearing the linear low density polyethylene is very low or ultra low density polyethylene.

Film 12 is preferably cross-linked. This may be done by pre-blending, prior to extrusion, a chemical cross-linking agent into one or more of the resins making up the oriented film.

Another, more preferred method is irradiation.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

On each side or surface of the core film, hot blown barrier films 14a and 14b are respectively bonded. Film 14a has a central layer 22a of ethylene vinyl alcohol copolymer, an outer heat sealable layer 24a, and an inner bonding layer 26a of ethylene vinyl acetate copolymer.

Film 14b, on the opposing surface of core film 12, has a structure identical to film 14a. Thus, layer 22b will have the same composition as 22a, and layers 26b and 24b will have the same composition as layers 26a and 24a respectively.

In the most preferred embodiment, the outer heat sealable materials making up layers 24a and 24b are a blend of 90% linear low density polyethylene or ethylene vinyl acetate copolymer and about 10% of an antiblock material.

Also in the preferred embodiment, a polymeric adhesive material, such as a graft copolymer or other modified copolymer of ethylene vinyl acetate copolymer is located on either surface of the ethylene vinyl alcohol copolymer. Although EVA-based polymeric adhesives with an anhydride functionality are preferred, other polymeric adhesives with various polyolefinic bases will also be useful to some extent in providing interlaminar adhesion.

Finally, a layer of linear low density polyethylene is disposed between the heat sealable outer layer and one of the polymeric adhesive layers, and between the inner bonding layer and the other of the polymeric adhesive layers.

Thus, in the most preferred embodiment, hot blown film 14a and 14b is a seven layer structure in which the ethylene vinyl alcohol copolymer forms a central layer, and in which two discrete layers of linear low density polyethylene are present.

It has been found that several advantages are obtained from the present invention.

The biaxially oriented, cross-linked core film contributes to reduced elongation of the final laminate. This has an advantage in certain chub packaging applications where high elongation properties of the chub packaging material can detrimentally affect the dimensional stability of the filled package.

At the same time, it is believed that the blown films 14a and 14b provide the necessary oxygen barrier characteristics, and also resistance to shrink during sealing resulting in stronger longitudinal seals. Stronger seals are especially desirable to reduce the possibility of rupture of the filled package and loss of the package contents.

Where as in this case the elongation properties of the laminate are reduced, it is of greater importance to insure adequate seal strength. This is because the stresses put on the package either externally or by reason of the contained food product cannot be as easily accommodated by elongation of the film.

In the preferred embodiment, the biaxially oriented core film is irradiated to a dosage of about 9 MR. A preferable range of irradiation dosage is between about 4 MR and 12 MR.

Cross-linking may also be accomplished by the addition of chemical cross-linking agents to one or more of the components of the core film prior to extrusion.

Figure 2:
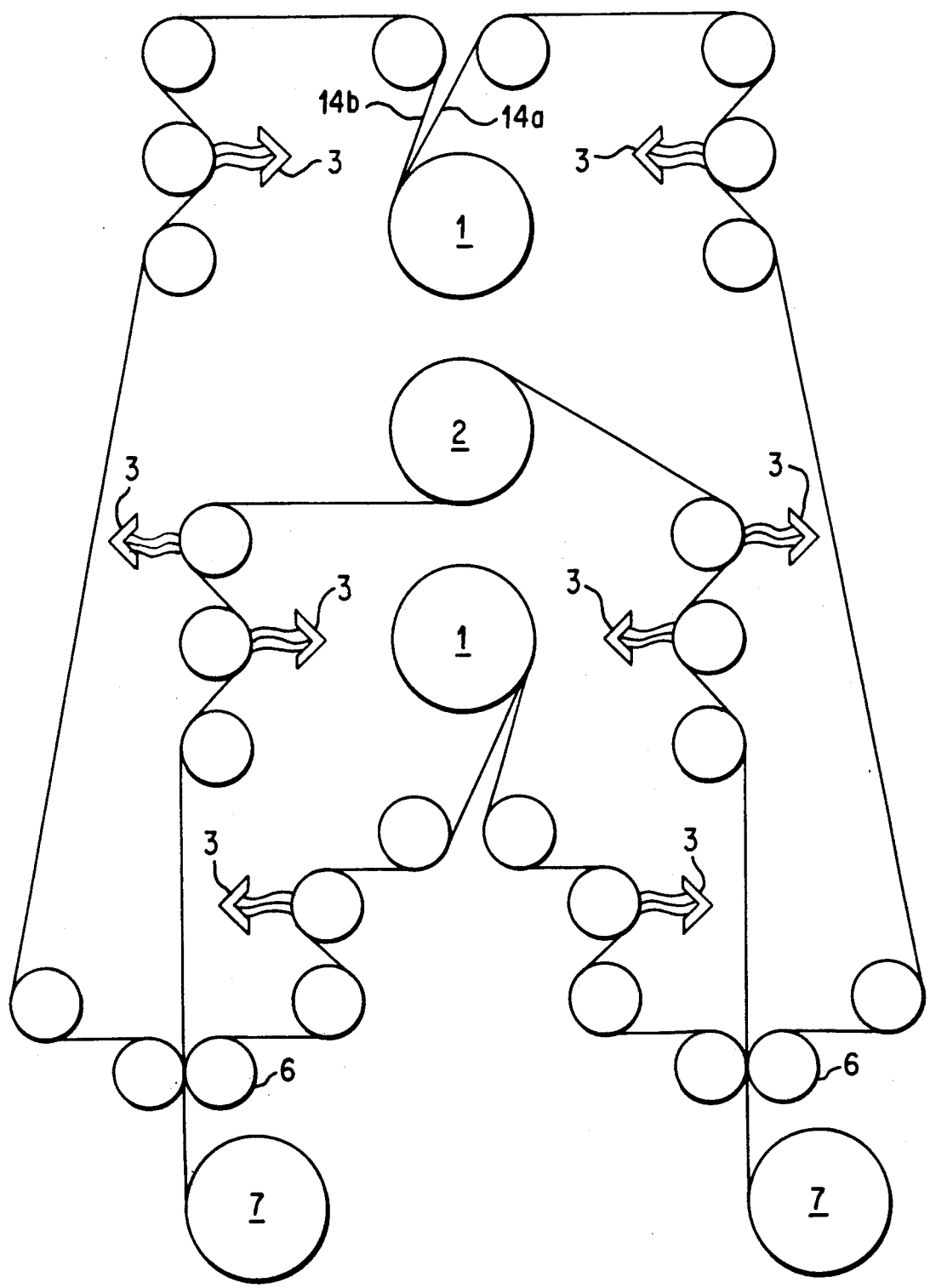
FIG. 2 is a schematic diagram of a method of making the laminated film of FIG. 1.

FIG. 2 shows a method of making the multilayer laminated film of the present invention. Referring to FIG. 2, a double wound half mil blown film is ply separated and one layer 14b is unwound 360° from roll 1 to place the inside of the previous double wound film on the outside. This exposes bonding layer 26b where it can be exposed to corona discharge treatment at station 3. This station is indicated to the left of upper roll 1 in FIG. 2.

The ply separated blown film is drawn over rollers past corona discharge stations 3.

At the same time, a double wound 0.60 mil stretch/shrink film is ply separated at roller 2 and drawn past other corona discharge stations 3 as depicted in the central portion of FIG. 2. At pinch roll 6, the single wound corona treated blown films from rollers 1 sandwich the single wound stretch/shrink film from roller 2 to create the multilayer laminated film of the present invention. This film is taken up on finished rolls 7. It is clear from the schematic drawing of FIG. 2 that this results in two simultaneous finished rolls 7 of film having the same construction.

The present invention may be further understood by reference to the following examples of laminated film constructions made in accordance with the present invention.

EXAMPLE 1

A three layer thermoplastic film was coextruded from a first melt stream of linear low density polyethylene (Dowlex 2045) and a second split melt stream of ethylene vinyl acetate copolymer (PE 204 CS95 available from El Paso) having a vinyl acetate content of about 3.6% by weight of the total resin. The coextrudate was irradiated to a dosage of 9 megarads and biaxially oriented by the blown bubble technique.

The linear low density polyethylene layers were extruded from separate extruders.

A second multilayer film was hot blown by standard coextrusion techniques, and having the following composition:

EVA/LLDPE/Tie/EVOH/Tie/LLDPE/EVA where
EVA = Exxon 32.89 (vinyl acetate content of about 4.5% by weight)
LLDPE = Dowlex 2045 (0.920 grams/cc density)
Tie = Plexar 169 (EVA based polymeric adhesive)
EVOH = Soarnol DT Ten percent of an antiblocking agent was preblended with the EVA prior to extrusion. This agent includes 90% low density polyethylene blended with 10% of a colloidal silica master batch.

The hot blown film was unirradiated.

The surface of the hot blown film which had only EVA was corona treated, as were both surfaces of the biaxially oriented stretch/shrink film. A second hot blown film identical to the first film was corona treated at its EVA surface and adhered to the opposite surface of the stretch/shrink film to form a 3-film laminate.

EXAMPLE 2

A multilayer laminate like that of Example 1 was produced, with the difference that in place of the outer layer having a blend of 90% EVA and 10% antiblock, a blend of 90% LLDPE (Dowlex 2035) having a density of 0.920 grams/cc was blended with 10% antiblock.

This laminated film had the same gauges as in Example 1, i.e. two outer hot blown films having a thickness of 50 gauge each, and a central stretch/shrink film, biaxially oriented, having a final thickness of 60 gauge.

EXAMPLE 3

A laminated film like that of Example 1 was produced, but with the outer hot blown films having a thickness of 75 gauge instead of 50 gauge.

Gauge variation was obtained by decreasing the deflate speed of the hot blown tubular material.

EXAMPLE 4

A laminated film like that of Example 3 was produced, with the exception that in place of the 60 gauge stretch/shrink film for the core film of the laminate, a 100 gauge biaxially oriented film having the composition LLDPE/EVA/LLDPE was utilized.

The present laminated film is characterized by relatively low transverse elongation, (see Tables 1 & 2). This property ensures better dimensional stability of the filled tubular film during the filling step of a VFFS process. However, it also puts greater stress on the longitudinal seal of the packaging, since less of the force exerted on the chub package during filling can be accommodated by transverse elongation of the tubular package.

For this reason, improved sealing characteristics are an important attribute of this film. In Tables 3 & 4, seal data is presented which demonstrates the improved seal strength of films of the present invention.

In Table 1, Examples 1 and 2 correspond to Examples 1 and 2 as described above. Comparative Example 1 refers to the HS660 film, and comparative Example 2 refers to the HS2000 film.

In Table 2, Examples 3 and 4 correspond to examples 3 and 4 as described above. Comparative Example 1 refers to the HS660 film, and comparative Example 2 refers to the HS2000 film.

In Table 3, Examples 1 and 2 correspond to the same examples as described above. Comparative Example 2 refers to the HS2000 film.

In Table 4, Examples 3 and 4 correspond to the same examples as described above. Comparative Example 2 refers to the HS2000 film.

Seals were applied with a Sentinel Sealer, equipped with a ⅛ inch seal bar at 40 psi seal pressure. Seal temperatures of 250° F. and 275° F. were used. Seal strength was determined using a CRE1000 Scott Tester. The seals were pulled in the conventional manner (designated "peel strength" in Tables 3 and 4) and also sheared.

As Tables 3 and 4 indicate, peel and shear strength at both 250° F. and 275° F. were improved, in some cases greatly improved, for the four examples of the present invention in comparison with comparative Example 2, with the exception of a weaker peel strength at the lower temperature for Example 2.

TABLE 1

| | Elongation[1] (%) at 73° F. at Break | | | |
|---|---|---|---|---|
| | Example 1 | Example 2 | Comparative Example 1 | Comparative Example 2 |
| Longitudinal | 185.7 | 211.8 | 521.6 | 337.8 |
| | (1.78) | (1.71) | (2.08) | (2.18) |
| Transverse | 199.6 | 232.6 | 624.5 | 592.0 |
| | (1.79) | (1.78) | (2.03) | (2.10) |

[1]ASTM D882-81 20 inches/minute draw rate; 2 inches initial length. All values are averages obtained from four (4) replicate measurements. Film gauges are indicated in parenthesis.

[1]ASTM D882-81 20 inches/minute draw rate; 2 inches initial length. All values are averages obtained from four (4) replicate measurements. Film gauges are indicated in parenthesis.

TABLE 2

| | Example 3 | Example 4 | Comparative Example 1 | Comparative Example 2 |
|---|---|---|---|---|
| Longitudinal | 193.6 | 199.8 | 521.6 | 337.8 |
| | (2.12) | (2.61) | (2.08) | (2.18) |
| Transverse | 142.7 | 173.4 | 624.5 | 592.0 |
| | (2.00) | (2.67) | (2.03) | (2.10) |

TABLE 3

SEAL STRENGTH DATA

| | Example 1 | Example 2 | Comparative Example 2 |
|---|---|---|---|
| Peel Strength (at 250° F.) | 4.23 ±0.61 | 0.57 ±0.67 | 1.22 ±0.16 |
| Peel Strength (at 275° F.) | 5.07 ±0.47 | 3.03 ±0.59 | 1.26 ±0.26 |
| Shear Strength (at 250° F.) | 10.98 ±1.92 | 9.42 ±1.15 | 6.37 ±0.21 |
| Shear Strength (at 275° F.) | 9.81 ±1.14 | 8.37 ±0.64 | 6.71 ±0.39 |

TABLE 4

Seal Strength Data

| | Example 3 | Example 4 | Comparative Example 2 |
|---|---|---|---|
| Peel Strength (at 250° F.) | 3.54 ±0.93 | 4.27 ±1.29 | 1.22 ±0.16 |
| Peel Strength (at 275° F.) | 6.62 ±0.90 | 5.85 ±1.52 | 1.26 ±0.26 |
| Shear Strength (at 250° F.) | 13.82 ±1.67 | 13.83 ±1.83 | 6.37 ±0.21 |
| Shear Strength (at 275° F.) | 11.43 ±1.63 | 17.73 ±2.65 | 6.71 ±0.39 |

EXAMPLE 5

A five layer thermoplastic film is coextruded from a first and fourth melt stream of a blend of linear low density polyethylene, linear medium density polyethylene, and ethylene vinyl acetate copolymer. A second melt stream of ethylene vinyl alcohol copolymer, and a split melt stream of a polymeric adhesive are also coextruded with the blend, to produce a five layer film having the construction:

LLDPE+LMDPE+EVA/TIE/EVOH/TIE/LLDPE+LMDPE+EVA

This biaxially oriented film is bonded on each of its major surfaces to a hot blown film having the construction of the hot blown film of any of the previous examples, but without the presence of EVOH.

The hot blown films are adhered to each of the major surfaces of the core layer of biaxially oriented film by means of corona bonding.

EXAMPLE 6

A laminated film like that of Example 1 is produced, with the difference that in place of the EVOH, a vinylidene chloride copolymer having a methyl acrylate comonomer is used. This material is commonly known as Saran.

EXAMPLE 7

A laminated film like that of Example 5 is produced, but having in the biaxially oriented film, in place of the EVOH, a vinylidene chloride copolymer with a methyl acrylate comonomer.

EXAMPLE 8

A laminated film like that of Example 6 is made, with the difference that in place of the vinylidene chloride methyl acrylate copolymer, vinylidene chloride vinyl chloride copolymer is used.

EXAMPLE 9

A laminated film like that of Example 7 is made, with the difference that in place of the vinylidene chloride methyl acrylate copolymer, a vinylidene chloride vinyl chloride copolymer is used.

While the present invention has been described with respect to preferred embodiments and specific examples, it will be understood by those skilled in the art that modifications may be made after review of the description of the invention without departing from the spirit and scope of the claims that follow.

What is claimed is:

1. A method of making a multilayer laminate useful in chub packaging comprising:
   a) melt extruding a first film;
   b) biaxially orienting said film;
   c) ply separating the first film into two plies, each ply having two outer surfaces;
   d) corona treating the two outer surfaces of one of the plies of the first film;
   e) melt extruding a second film by a hot blown method;
   f) ply separating the second film into two plies, each ply having two outer surfaces;
   g) corona treating an outer surface of one of the plies of the second film;
   h) melt extruding a third film by a hot blown method;
   i) ply separating the third film into two plies, each ply having two outer surfaces;
   j) corona treating an outer surface of one of the plies of the third film; and
   k) passing the corona treated plies between a pair of nip rolls such that the corona treated ply of the first film is sandwiched between and in communication with corona treated surfaces of the plies of the second and third films respectively to cause bonding thereof.

2. The method according to claim 1 wherein the first film is cross-linked.

3. The method according to claim 2 wherein the cross-linking step is accomplished by pre-blending chemical cross-linking agents into the first and then extruding said film.

4. The method according to claim 2 wherein the cross-linking step is accomplished by irradiation of the first film after extrusion.

* * * * *

UNITED STATES PATENT AND TRADEMARK OFFICE
CERTIFICATE OF CORRECTION

PATENT NO.  :  5,089,073
DATED       :  February 18, 1992
INVENTOR(S) :  H. G. Schirmer It is certified that error appears in the above-identified patent and that said Letters Patent is hereby corrected as shown below:

In column 8, line 22 of the claims, after "first", insert --film--.

Signed and Sealed this

Fourth Day of May, 1993

Attest:

MICHAEL K. KIRK

*Attesting Officer*   *Acting Commissioner of Patents and Trademarks*